United States Patent [19]
Basse

[11] 3,765,002
[45] Oct. 9, 1973

[54] ACCELERATED BIT-LINE DISCHARGE OF A MOSFET MEMORY

[75] Inventor: Paul-Werner V. Basse, Nantwein, Germany

[73] Assignee: Siemens Aktiengesellschaft, Berlin and Munich, Germany

[22] Filed: Mar. 24, 1972

[21] Appl. No.: 237,654

[30] Foreign Application Priority Data

Apr. 20, 1971 Germany.................. P 21 19 059.0

[52] U.S. Cl. .............. 340/173 CA, 307/291, 320/1, 340/173 FF

[51] Int. Cl. .......................... G11c 7/00, G11c 11/24

[58] Field of Search .................. 340/173 R, 173 FF, 340/173 CA; 307/238, 291; 320/1

[56] References Cited

UNITED STATES PATENTS 3,467,952 9/1969 Shiraishi.......................... 340/173 R

OTHER PUBLICATIONS

Wiedmann, Monolithic Circuit with Pinch Resistor, IBM Technical Disclosure Bulletin, Vol. 13 No. 9, 2/71, p. 2469.

Lewis, Transistor Pull-Up, IBM Technical Disclosure Bulletin, Vol. 14 No. 8, 1/72, p. 2303.

Lane, Bipolar FET High-Speed Logic Switch, IBM Technical Disclosure Bulletin, Vol. 14 No. 12, 5/72, pp. 3684–3685.

*Primary Examiner*—Bernard Konick
*Assistant Examiner*—Stuart Hecker
*Attorney*—Carlton Hill et al.

[57] ABSTRACT

A memory having at least one storage cell constructed of MOS field effect transistors in which the reading of information of one kind from a storage cell is effected by discharging the line capacitance of the associated bit line wherein a discharge circuit includes a MOS field effect transistor switch whose controlled conduction path is connected between the bit line and a fixed potential and is rendered conductive only when the line capacitance has been discharged to a predetermined voltage via the read storage cell when the one type of information is being read.

5 Claims, 8 Drawing Figures

ACCELERATED BIT-LINE DISCHARGE OF A MOSFET MEMORY

BACKGROUND OF THE INVENTION

1. Field of the Invention

This invention relates to a memory having at least one storage cell constructed of MOS field effect transistors in which reading of one type of information from the storage cell is effected through means for discharging the line capacitance of the associated bit conductor via the storage cell.

2. Description of the Prior Art

Memories employing storage cells constructed with MOS field effect transistors are well known in the art. For example reference may be taken to the article appearing on Pages 83–87 of the periodical Computer Design, June 1970. This literature shows that the storage cells of MOS memories can be constructed according to static or dynamic principles. The mode of operation of such a static or dynamic storage cell and application thereof in a memory are described in detail and reference may be had thereto for a description which will not be treated in detail herein. The writing in a storage cell or reading from the storage cell is effected via at least one bit line connected to the storage cell whereby the line capacitance of the bit line or lines is charged or discharged via the storage cell.

The access time of a MOS memory is, therefore, essentially determined by the time which is required by the storage cells for charging (for example when a "1" is read) or discharging (for example when a "0" is read) respectively, the capacitance of the bit line. Due to space and power requirements, however, a storage cell must be designed small and with a high resistance. It can, therefore, only supply a small amount of current for recharging the bit line capacitance.

In particular, the charging of the bit line capacitance can be carried out by the static storage cell alone only during a very long period of time. Therefore, the prior art has employed load resistances which also consist of MOS transistors which are continuously turned on or which are scanned in order to reduce power consumption. In the case of dynamic storage cells, load resistances, which are also scanned, must always be employed since the storage cells alone are not capable of charging the bit line capacitance.

The discharging of the bit line capacitance via a storage cell during the reading process of the storage cell also influences the cycle time. Such a discharge of the bit line capacitance via the storage cell is always required when information of one kind, for example a binary "0," is suppose to be read, while when information of the other kind, a binary "1," is read the bit line capacitance cannot be discharged.

SUMMARY OF THE INVENTION

In view of the above, it is the primary object of the present invention to provide a memory of the type described wherein the discharge of the bit line capacitance is augmented depending on the information stored in a storage cell, and wherein the storage cells may be constructed according to both the static and dynamic principles.

The foregoing and other objects are realized according to the present invention by the provision of a discharge circuit having a MOS field effect transistor switch whose controlled conduction path is connected between the bit line and a fixed potential and is rendered conductive only when the bit line capacitance has already discharged to a predetermined voltage, via the storage cell being read, when information of one kind is read.

The discharge circuit may not influence the discharge process of the fully-charged line capacity of the bit line so that the bit line capacitance discharges automatically when information of the other kind is read. Only when a certain firing potential is reached will the discharge circuit operate to speed the discharge of the bit line capacitance.

The discharge circuit may advantageously comprise a MOS field effect transistor whose controlled path is connected between the bit line and a fixed potential. This MOS transistor can then advantageously be one of the storage transistors of a bistable flip-flop circuit.

A particular advantage is also provided since it can be utilized as a read amplifier of the storage cells connected to the bit line. In read amplifiers of prior art memories the input is decoupled from the output; whereas, these read amplifiers supply a current to the output when information of one kind is provided on the bit line which is connected to the input of the read amplifier. This current can be extended, via selection switches, to the data output of the memory. For information of the opposite kind, no current is supplied.

The task of the read amplifier is taken over and manifest in the discharge circuit since it either supplies a current, also depending on the information on the bit line, or remains blocked. Since, as opposed to the conventional read amplifier, the input and output are connected, i.e., not decoupled, the output current of the discharge circuit operating as a read amplifier is utilized to speed the discharge of the bit line capacitance. Therefore, during reading the information stored in the storage cell is transferred to the data output of the memory at a faster rate.

BRIEF DESCRIPTION OF THE DRAWINGS

Other objects, features and advantages of the invention, its organization, construction and operation will be best understood from the following detailed description of the invention taken in conjunction with the accompanying drawings, in which.

DESCRIPTION OF THE PREFERRED EMBODIMENTS

Figure 1:
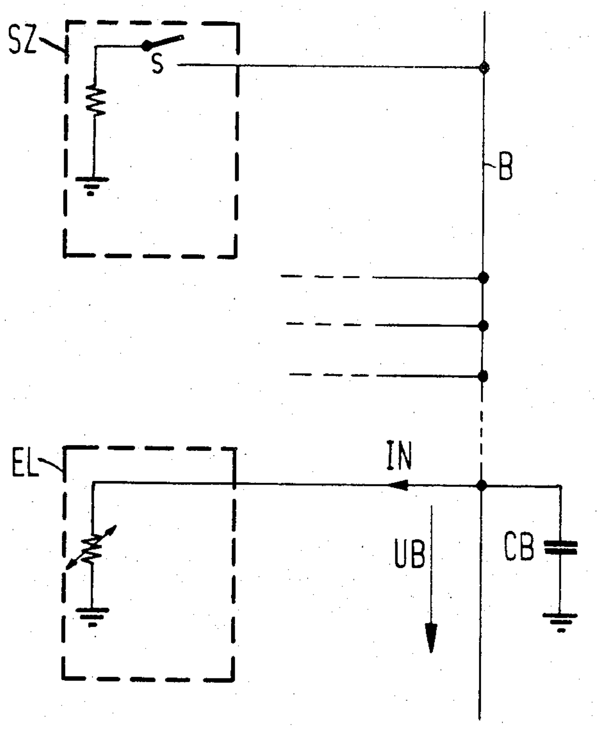
FIG. 1 is a schematic representation of a simplified circuit which illustrates the basic principles of the invention.

The basic principles of the present invention are illustrated in FIG. 1 wherein a discharge circuit EL and a storage cell SZ are schematically shown. The storage cell SZ is connected with a bit line B via a switch S; the storage cell SZ is here schematically represented as a resistor by which the bit line capacitance can be discharged. The bit line capacitance is illustrated as a capacitor CB in order to facilitate understanding the invention. The discharge circuit EL consists, in principle, of a controlled resistance which is connected between the bit line B and a fixed potential, for example ground. The control resistance, independent of the information to be read, and therefore independent of the charge state of the bit line capacitance CB, has a very high resistance value or a very low resistance value. In the low resistance value condition the discharge circuit supports the discharge of the bit line capacitance CB, which would otherwise necessarily be effected only via the storage cell SZ.

Figure 2:
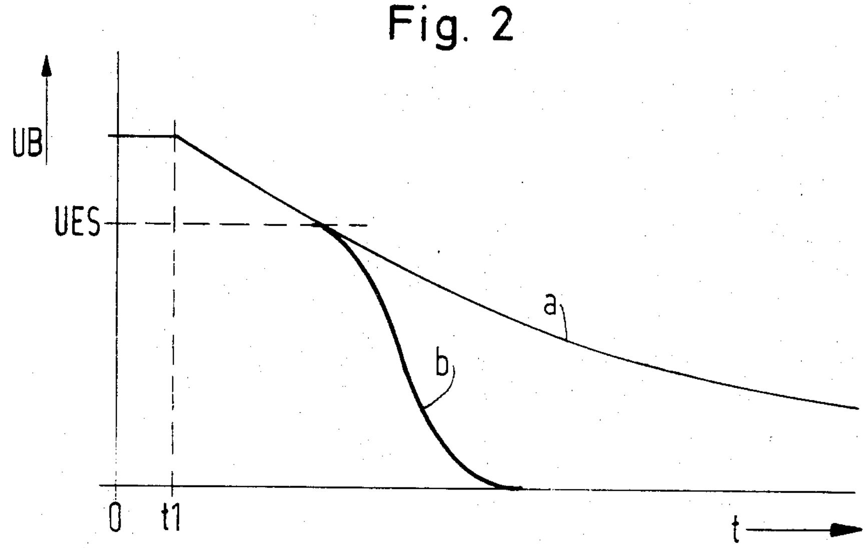
FIG. 2 is a graphical illustration of the mode of operation of the circuit of FIG. 1.

The mode of operation of the circuit of FIG. 1 is in accordance with the graphical illustration of FIG. 2. A voltage UB between the bit line B and ground is shown on the ordinate of FIG. 2 and time *t* is shown on the abscissa. With a storage cell SZ constructed, for example, according to dynamic principles, the bit line B will be prepared at the beginning of the reading process whereby the bit line capacitance CB is charged to a predetermined voltage. If information of one kind, for example a binary "1," the switch S remains open and the bit line capacitance CB cannot discharge. The bit line capacitance CB also cannot discharge via the discharge circuit in a high impedance state.

If information of the opposite kind, for example a binary "0," is stored in the storage cell SZ, the switch S will be closed and the bit line capacitance CB begins to discharge. In the diagram of FIG. 2 the bit line is prepared at the time 0, i.e. the bit line capacitance is charged. At the time *t*1 the storage cell SZ is triggered and the switch S is closed, and the discharge of the line capacitance CB is initiated. When the potential on the bit line reaches a predetermined potential UES, the firing potential of the discharge circuit EL, the discharge circuit will be conditioned to a low resistance value and support the discharge of the bit line capacitance CB. Since the resistance of the discharge circuit EL is low and is in parallel with the resistance of the storage cell SZ, the discharge of the bit line capacitance is greatly accelerated. Therefore, discharge occurs in accordance with the curve *b* rather than the curve *a*.

Figure 3:
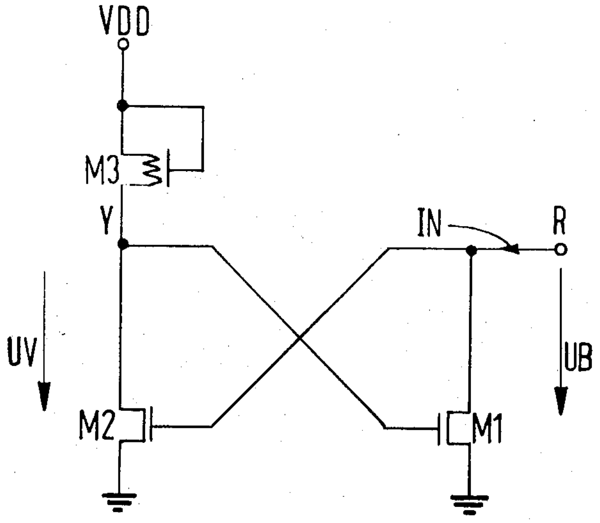
FIG. 3 is a schematic circuit diagram of a discharge circuit constructed in accordance with the teachings of the present invention.

Referring to FIG. 3, an embodiment of a discharge circuit EL is illustrated as a bistable flip-flop circuit comprising two MOS field effect transistors M1, M2 interconnected in a known manner. The transistor M2 is connected to a fixed potential VDD by way of a MOS transistor M3 having its source and drain connected in series with the transistor M2 and its gate connected to the source. A point R is connected to the bit line B. The voltage UB is applied to the controlled path of the transistor M1 so that a current IN flows into the discharge circuit. The connection point R of the bistable circuit serves as both the input and output of the discharge circuit.

As long as the bit line capacitance CB is still charged to a high voltage and the firing potential has not been reached, the transistor M2 is conductive and has only a small voltage drop UV across its controlled path. Therefore, the transistor M1 is blocked and the discharge circuit has effect of a high value resistor. With a decreasing voltage UB and the transistor M2 becomes less conductive, the voltage UV across the controlled path of the transistor M2 increases due to the current through the load transistor M3. As soon as the voltage UV has reached the threshold voltage of the transistor M1, the transistor M1 becomes conductive. At this point the voltage UB has then reached the firing potential UES. The firing potential can be determined by the dimensioning of the transistors M2 and M3.

Figure 4:
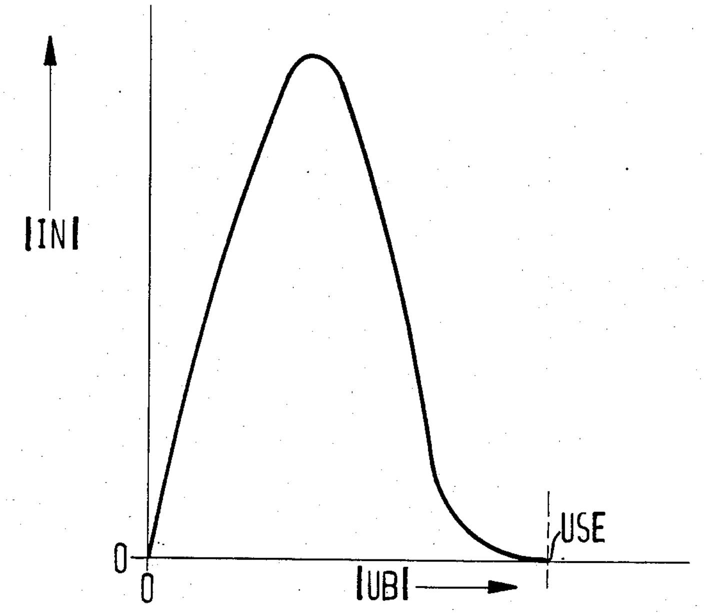
FIG. 4 is a graphical illustration of the output characteristic of the discharge circuit.

Since the transistor M1 is now conductive, the discharge circuit has the effect of a small value resistor, so that the bit line capacitance CB can discharge via the discharge circuit, i.e., via the controlled path of the transistor M1. The discharge current IN, depending on the voltage UB, results as illustrated in FIG. 4. With a smaller value of the voltage UB the current IN first increases to a maximum and then decreases as low as zero as the voltage UB increases. The maximum value of the current IN is determined by the dimensioning of the transistor M1.

Figure 5:
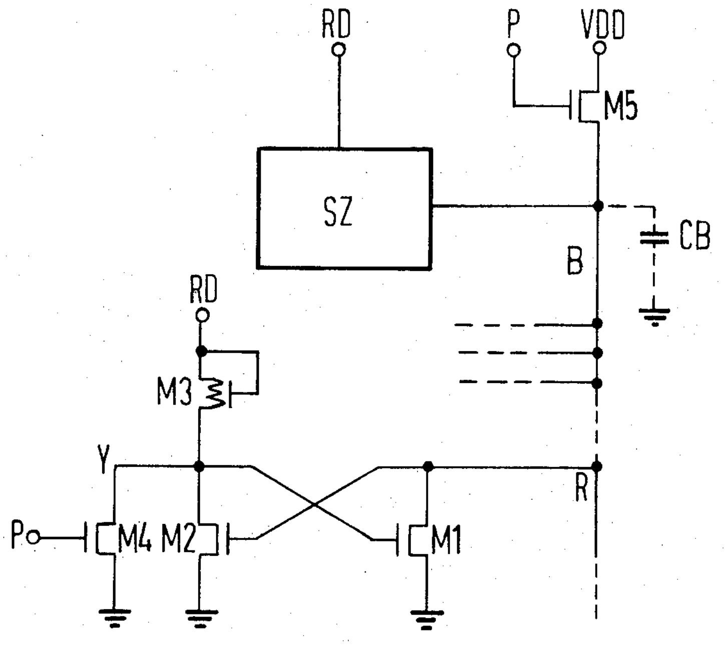
FIG. 5 is a schematic circuit diagram of a discharge circuit connected to a plurality of storage cells via a bit line.
Figure 6:
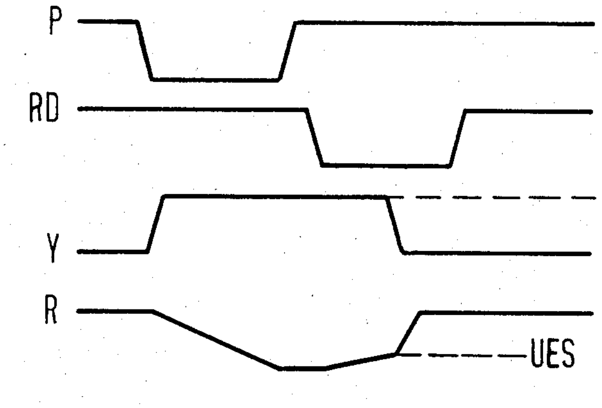
FIG. 6 is a pulse diagram applicable to the circuit of FIG. 5 using *p*-type MOS field effect transistors.

Referring to FIG. 5, the interconnection of storage cells SZ with a discharge circuit is illustrated, the storage cell being constructed in accordance with dynamic principles. The discharge circuit of FIG. 3 is provided with additional control in the form of a MOS field effect transistor M4 which has its controlled conduction path connected across the like path of the transistor M2. With the help of a pulse at a point P (see line P of FIG. 6), the bit line B (the capacitance CB) is first charged via a MOS transistor M5 and therefore prepared for accommodating new information, and secondly the discharge circuit is reset via the MOS transistor M4 (see line Y of FIG. 6). Upon the application of a read pulse RD at the points RD (see line RD of FIG. 6) both the selected storage cell and the discharge circuit are activated. If a "0" is stored, the bit line B (capacitance CB) begins to discharge and this discharge is supported when the point R reaches the firing potential UES as shown in line R of FIG. 6. If, however, a "1" is stored, the bit line B remains at a high negative potential so that it cannot be influenced by the discharge circuit. VDD is a fixed potential.

Of course, the discharge circuit can be constructed with both p-channel MOS field effect transistors and with *n*-channel MOS field effect transistors.

If the discharge circuit EL is connected into a high impedance RC line at its center, the signal transmission along the line is accelerated by the discharge circuit. As soon as the leading edge of the signal exceeds the firing potential UES, the line will be connected, via the discharge circuit in its low resistance state, to ground and therefore effects amplification of the discharge of the RC line. It is therefore, highly advantageous to connect the discharge circuit at the center of the bit lines, rather than at the ends of such lines, to effect high speed information transmission on even highly resistant bit lines.

The discharge circuit therefore provides fast and complete discharge of the bit line capacitance during reading of the information. This advantageous property is important for dynamic MOS memories, since the information is to be written back into the storage cell during the required regenerating process.

Since the discharge circuit supports the discharge of the capacitance CB of the bit line B, due to the low impedance output of the discharge circuit, when a "0" is read, the discharge circuit is able to supply current to the data output of the memory. Therefore, it may additionally serve as a read amplifier which is usually separately associated with a bit line.

Figure 7:
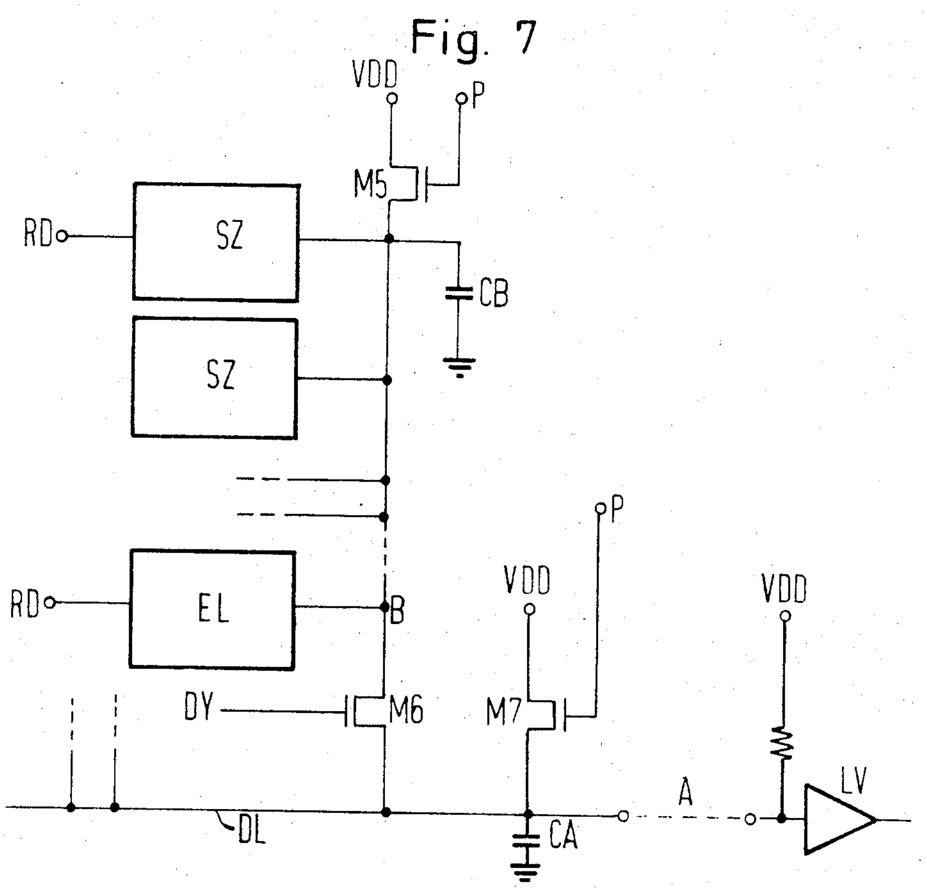
FIG. 7 is a schematic circuit diagram of a column of storage cells of a memory, together with a discharge circuit and the data output of the memory.
Figure 8:
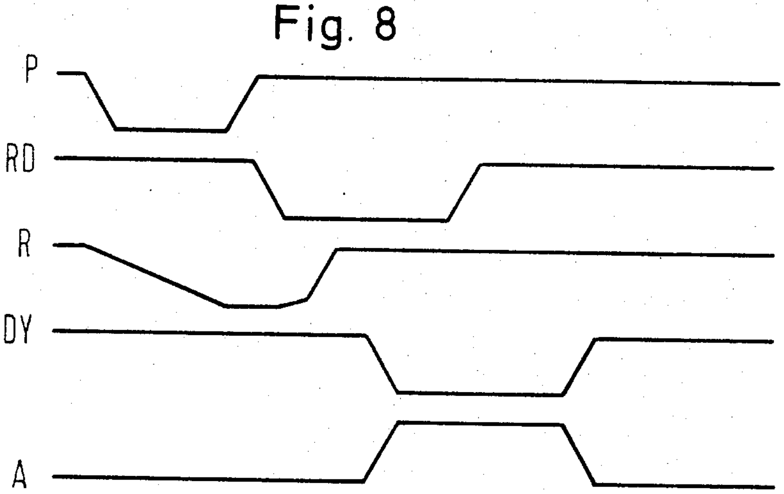
FIG. 8 is a pulse diagram applicable to the circuit of FIG. 7 wherein a discharge circuit simultaneously serves as a read amplifier.

FIG. 7, together with FIG. 8, illustrates the utilization and mode of operation of a discharge circuit EL as a read amplifier of a bit line. In FIG. 7, one of a number of columns of storage cells SZ is illustrated. The storage cells SZ are connected to a common bit line B having a line capacitance CB. One end of the bit line B is connected to the potential VDD via the field effect transistor M5. The control input of the transistor M5 is provided with the charge pulse P. The discharge circuit EL, as constructed in FIG. 5, is connected to the bit line B. The bit line B, and thus the column of the storage cells SZ is selected by way of the field effect transistor M6 under the control of an input pulse DY. The field effect transistor M6 is connected with a data line DL, which commonly serves the other bit lines of the memory, and which extends toward an external read amplifier LV. The amplifier LV is only illustrated in principle, since its particular construction is not required for understanding the function of the discharge circuit as a read amplifier. Furthermore, a field effect transistor M7 has been illustrated by which the data line capacitance referenced CA, is charged to the fixed potential VDD when the charge pulse P is applied.

When the charge pulse P is applied (line P of FIG. 8) the capacitance CB of the bit line B will begin to charge (line R of FIG. 8), as previously discussed. (The capacitance CA of data line DL will also begin to charge.) The data line has been preconditioned to a negative potential at the point A, (see line A of FIG. 8.) If the "read" pulse RD occurs and if a "0" is stored in the storage cell SZ which is to be read, the bit line will discharge via the storage cell SZ and the discharge circuit EL. (See line R of FIG. 8.) After reaching the firing potential and after discharging has been completed, the pulse DY is supplied to the control input of the field effect transistor M6 to connect the bit line B to the data line DL so that the information read from a storage cell SZ is provided to the data line DL. Therefore, a current flows from the data line DL to ground via the transistor M6 and the discharge circuit EL serves as a read amplifier.

The read current, which can be supplied by the discharge circuit to the data line DL, may, of course, only then be interrogated when the discharge circuit has discharged the capacitance CB of the bit line B when a "0" has been read. Otherwise, the storage cell SZ would be loaded and unable to discharge the capacitance CB of the bit line B to the firing potential UES of the discharge circuit EL.

Since the discharge circuit EL has been constructed as a bistable flip-flop circuit, it stores the information read from a storage cell SZ. This means that the information read from a storage cell SZ may be supplied to the data output when the storage cell has already been separated from the bit line, thus when the read pulse RD has ended.

Although I have described my invention by reference to specific illustrative circuits, many changes and modifications of my invention may become apparent to those skilled in the art without departing from the spirit and scope of my invention. It is therefore to be understood that I intend to include within the patent warranted hereon all such changes and modifications which may reasonably and properly be included within the scope of my contribution to the art.

I claim:

1. A memory comprising: at least one storage cell constructed of MOS field effect transistors; a bit line connected to said storage cell and having a bit line capacitance which is discharged via said storage cell when one type of information is read; and a discharge circuit including a MOS field effect transistor switch having a controlled path connected between said bit line and a fixed potential and operable in response to discharging of said bit line capacitance via said storage cell to a predetermined voltage to conduct and speed the discharge of said bit line capacitance, said MOS field effect transistor switch of said discharge circuit being part of a bistable circuit including first and second MOS field effect transistors having respective controlled conduction paths and connected as a bistable circuit, and a third MOS field effect transistor connected as a load transistor connecting the controlled conduction path of said first MOS transistor to another fixed potential, said second MOS transistor having its controlled conduction path connected to said bit line, said first MOS transistor having a control input also connected to said bit line, and said second MOS transistor having a control input also connected to the other fixed potential via said third MOS transistor.

2. A memory according to claim 1, comprising means for charging said bit line capacitance; and a fourth MOS field effect transistor having a controlled conduction path connected across the controlled conduction path of said first MOS transistor and operable to reset the bistable circuit when said charging means is effective to charge said bit line capacitance.

3. A memory comprising: at least one storage cell constructed of MOS field effect transistors; a bit line connected to said storage cell and having a bit line capacitance which is discharged via said storage cell when one type of information is read; and a discharge circuit including a MOS field effect transistor switch having a controlled path connected between said bit line and a fixed potential and operable in response to discharging of said bit line capacitance via said storage cell to a predetermined voltage to conduct and speed the discharge of said bit line capacitance.

4. A memory according to claim 3, comprising: a plurality of said storage cells arranged in columns and lines; a plurality of said bit lines respectively connected to the storage cells of respective columns; and a plurality of said discharge circuits connected to the centers of respective ones of said bit lines.

5. A memory according to claim 4, wherein each of said discharge circuits constitutes a read amplifier, said memory comprising a data output and means for supplying the information read out of a storage cell from the associated discharge circuit to said data output after said bit line capacitance has been discharged when said one type of information has been read.

* * * * *